H. J. S. KEIM.
TIRE FILLER.
APPLICATION FILED JUNE 2, 1914.
1,154,318. Patented Sept. 21, 1915.
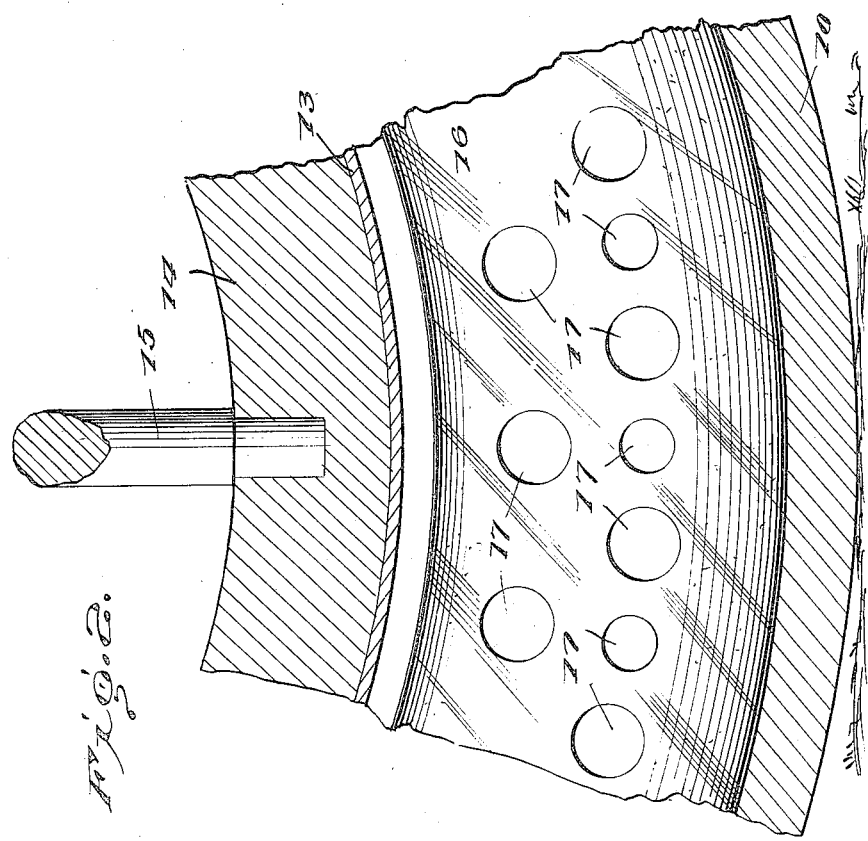
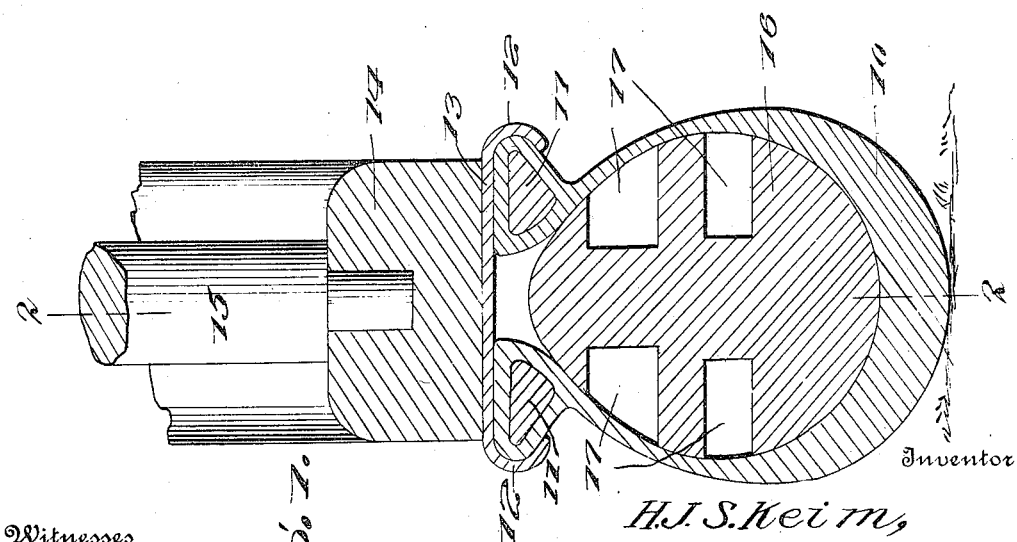

UNITED STATES PATENT OFFICE.

HARRY J. S. KEIM, OF CATASAUQUA, PENNSYLVANIA.

TIRE-FILLER.

1,154,318. Specification of Letters Patent. Patented Sept. 21, 1915.

Application filed June 2, 1914. Serial No. 842,418.

*To all whom it may concern:*

Be it known that I, HARRY J. S. KEIM, citizen of the United States, residing at Catasauqua, in the county of Lehigh and State of Pennsylvania, have invented certain new and useful Improvements in Tire-Fillers, of which the following is a specification.

This invention relates to improvements in tires for automobiles and like vehicles of the class of cushion tires, and has for one of its objects to provide a simply constructed device which possesses the requisite resiliency and durability without danger of puncture.

Another object of the invention is to provide a simply constructed device in which the resiliency is increased without reducing the resistance.

Another object of the invention is to provide a device of this character which possesses the same resiliency as the ordinary pneumatic tire without danger of puncture or blow-outs and increases the durability of the tire casing and at the same time permits carrying the weight of the vehicle and load without flattening the tire casing.

With these and other objects in view the invention consists in certain novel features of construction as hereinafter shown and described and then specifically pointed out in the claims; and in the drawings illustrative of the preferred embodiment of the invention—Figure 1 is a transverse section of a tire constructed in accordance with the improvement. Fig. 2 is a section on the line 2—2 of Fig. 1.

Corresponding and like parts are referred to in the following description and indicated in all the views of the drawings by the same reference characters.

The improved device may be applied to any of the ordinary tire casings, and it is not desired therefore to limit the invention in this respect, but for the purpose of illustration the improved device is shown applied to a conventional tire casing, the heavy body portion being represented at 10 and the clencher ribs at 11 in position to be engaged in the ordinary manner by the clencher flanges 12 of the rim 13. The felly portion of the wheel is indicated at 14 and one of the spokes at 15. In the improved tire the usual air tube is not employed, but the interior of the casing 10 is filled with a core member represented as a whole at 16 which conforms in outline to the interior of an ordinary pneumatic tire when expanded, so that the improved tire presents the same appearance as the ordinary pneumatic tire. The core 16 is constructed of relatively soft rubber or like material and is provided with a plurality of outwardly opening cavities or recesses 17 spaced apart entirely around the core, longitudinally.

The cavities may be of any required size or shape and disposed at any required distance apart, but will generally be arranged as represented in Fig. 2 with a row of relatively large recesses near the lower edge of the core and a row of alternating relatively large and relatively small recesses slightly beyond the center or medial line of the core. By this means a relatively large portion of the core is disposed externally of the outer row of recesses, so that a relatively large bulk or mass of the material of the core is retained at the center as shown in Fig. 1, to receive the heaviest impact when strain is applied by the load of the vehicle or when running over obstructions. Thus, the full strength of the core is retained centrally thereof to resist the pressure, while the outwardly opening cavities 17 are located at the sides of the core, or where they do not materially weaken the structure. The core is thus materially lightened without detriment to its resisting qualities, while at the same time the resiliency is increased.

Having thus described the invention, what is claimed as new is:

1. A core for a tire formed of resilient material and of uniform texture with the central portion continuous, said core having a series of concentrically arranged relatively large cavities of uniform size and opening laterally and located near the inner portion of the core, and a series of other concentrically arranged cavities alternately large and small in diameter, the smaller cavities of the outer series being located in radial alinement with the inner cavities and the larger cavities of the outer series arranged in staggered relation to the inner series of cavities and all of the cavities terminating at the continuous central portion, whereby the resiliency of the tire is increased and the weight decreased.

2. A core for a tire formed of resilient material and of uniform texture and egg-shaped transversely and adapted to be inclosed in the shoe of an automobile tire with the smaller portion of the core directed inwardly, said core having a continuous central portion and a series of concentrically arranged relatively large cavities of uniform size and opening laterally and located near the inner smaller portion of the core, and a series of other concentrically arranged cavities alternately large and small in diameter and located substantially midway of the core, the smaller cavities of the outer series being located in radial alinement with the inner cavities and the larger cavities of the outer series arranged in staggered relation to the inner series of cavities, the inner ends of all of the cavities terminating at the continuous central portion, whereby the major portion of the material of the core is contained within the larger outer portion and the cavities contained in the inner smaller portion of the core to increase the resiliency of the tire and decreasing its weight.

In testimony whereof I affix my signature in presence of two witnesses.

HARRY J. S. KEIM. [L. S.]

Witnesses:
   CHARLES J. KEIM,
   EDWIN H. FENSTERMACHER.

Copies of this patent may be obtained for five cents each, by addressing the " Commissioner of Patents, Washington, D. C."